(12) United States Patent
Souma et al.

(10) Patent No.: US 8,308,215 B2
(45) Date of Patent: *Nov. 13, 2012

(54) LOWER STRUCTURE OF VEHICLE BODY REAR PART

(75) Inventors: Takayuki Souma, Hamamatsu (JP); Norio Nishida, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 45 days.

This patent is subject to a terminal disclaimer.

(21) Appl. No.: 12/974,342

(22) Filed: Dec. 21, 2010

(65) Prior Publication Data

US 2011/0155772 A1   Jun. 30, 2011

(30) Foreign Application Priority Data

Dec. 24, 2009 (JP) ................................. 2009-292488

(51) Int. Cl.
*B62D 43/00* (2006.01)
(52) U.S. Cl. ................................. 296/37.2; 296/187.11
(58) Field of Classification Search .................. 296/37.2, 296/187.11
See application file for complete search history.

(56) References Cited

U.S. PATENT DOCUMENTS 7,380,856 B2 * 6/2008 Kobayashi et al. .......... 296/37.2
7,677,651 B2 * 3/2010 Yamaguchi et al. ..... 296/203.04

FOREIGN PATENT DOCUMENTS

| JP | 10-316050 A | 12/1998 |
|---|---|---|
| JP | 2006-205810 A | 8/2006 |
| JP | 2009-179181 A | 8/2009 |

* cited by examiner

Primary Examiner — Joseph Pape
(74) Attorney, Agent, or Firm — Alston & Bird LLP (57) ABSTRACT

A lower structure of a vehicle body rear part, when receiving a load from a rear side of the vehicle, prevents deformation of a spare tire housing toward a front side of the vehicle and displacement of the front end of a spare tire toward the front side of the vehicle, and also facilitates the tipping up of a rear portion of the spare tire. In particular, a lower structure of a vehicle body rear part 1 has a spare tire housing 3 formed in a rear floor 2 of the vehicle body rear part 1; a rear cross member 5 which joins paired side frames 4 arranged respectively on a left side and a right side in a vehicle width direction, and which is provided at a location frontward of the spare tire housing 3; and a hook reinforcement 6 for a tow hook 14, extending in a vehicle front and rear direction and arranged at a center, in the vehicle width direction, of a bottom surface of the spare tire housing 3, wherein a front end of the hook reinforcement 6 is attached to the rear cross member 5, the hook reinforcement 6 forms a closed cross section in cooperation with the rear floor 2 and is formed such that the closed cross section is larger on a rear side than on a front side, and the hook reinforcement 6 is divided into a reinforcement front portion 6b and a reinforcement rear portion 6c (FIG. 2).

7 Claims, 8 Drawing Sheets

LOWER STRUCTURE OF VEHICLE BODY REAR PART

FIELD OF THE INVENTION

The present invention relates in particular to a lower structure of a vehicle body rear part of a vehicle which includes a spare tire housing formed at a rear floor of the vehicle body rear part.

BACKGROUND OF THE INVENTION

In typical vehicles, a spare tire housing for housing a spare tire is provided at a rear floor in a vehicle body rear part. When a vehicle having such a structure receives a load from a rear side of the vehicle, the front end of the spare tire moves toward a front side of the vehicle, so that the spare tire housing is deformed and is displaced toward the front side of the vehicle. Since, in particular, a fuel tank may be arranged forward of the spare tire housing, the deformed spare tire housing may possibly come into contact with the fuel tank. Therefore, such deformation and displacement are undesirable.

One possible countermeasure against such an event is to secure sufficient space between the spare tire housing and a back panel, so that the load can be absorbed around the spare tire housing. In addition, in the case in which the fuel tank is arranged forward of the spare tire housing, another possible countermeasure is to secure a sufficient distance between the spare tire housing and the fuel tank so that the load can be absorbed around the spare tire housing.

On the other hand, it is necessary to secure a space to arrange components other than the spare tire housing and the fuel tank. Furthermore, there are many limitations in the layout of body components. Therefore, in many cases, it is unlikely that a sufficient space can be secured behind the spare tire, that a sufficient distance can be secured between the spare tire housing and the fuel tank, etc. If sufficient space behind the spare tire housing, the sufficient distance between the spare tire housing and the fuel tank, etc., were secured, there would be a problem in that the vehicle body would increase the size of the vehicle. In particular, this problem is more serious for small vehicles.

Furthermore, when a load from the rear side of the vehicle is applied, the front end of the spare tire sometimes moves upward and forward. In this case, since rear seats are arranged at locations forward of and above the spare tire housing, the front end of the spare tire may come into contact with the rear seats, and this would be a problem.

For example, Japanese Unexamined Patent Publication No. 10-316050 discloses the following structure to avoid contact of a deformed spare tire housing with the fuel tank. A spare tire is housed within the spare tire housing in an inclined orientation so as to place a front side of the spare tire above the arrangement location of a fuel tank.

Japanese Unexamined Patent Publication No. 2006-205810 discloses the following structure to avoid contact of a deformed spare tire housing with a fuel tank and also to prevent contact of a front end of a spare tire with rear seats. In this structure, when receiving a load from a rear side of the vehicle, side frames, which are arranged on both ends, in the vehicle width direction, of a rear floor, deform respectively at locations forward of the spare tire housing in the rear floor so as to lift up the rear seats which are arranged generally above the fuel tank.

Japanese Unexamined Patent Publication No. 2009-179181 discloses the following structure. A spare tire is arranged within a spare tire housing in an inclined orientation while the front end thereof is down. When receiving a load from a rear side of the vehicle, a rear portion of the spare tire is tipped up so as to be vertically turned around the front end of the spare tire toward a front side of the vehicle. This reduces the load which is applied to a structure in front thereof on the basis of the front end of the spare tire.

BRIEF SUMMARY OF THE INVENTION

However, in the above structure of Japanese Unexamined Patent Publication No. 10-316050, the spare tire is merely housed within the spare tire housing in the inclined orientation while placing the front side of the spare tire above the arrangement location of the fuel tank. Therefore, when a load from the rear side of the vehicle is applied, the front end of the spare tire is likely to move upward and forward. In this case, the front end of the spare tire may come into contact with the rear seats.

In the above structure of Japanese Unexamined Patent Publication No. 2006-205810, the side frames merely deform at locations forward of the spare tire housing in the rear floor so as to lift up the rear seats which are located above the fuel tank. Therefore, when receiving the load from a rear side of the vehicle, the deformation and displacement of the spare tire housing, and the displacement of the front end of the spare tire toward the front side of the vehicle, cannot be sufficiently suppressed, and this is a problem.

Furthermore, it is conceivable to increase the angle at which the spare tire inclines so as to facilitate the vertical turn, as in the above structure of Japanese Unexamined Patent Publication No. 2009-179181. This increase in angle, however, causes a problem in that the luggage space is made smaller in the vertical direction.

The present invention has been made in view of the above circumstances, and it has as an object to provide the following lower structure of a rear part of a vehicle. The lower structure is capable of, in a case of receiving a load from a rear side of the vehicle, preventing the deformation of a spare tire housing toward a front side of the vehicle and the displacement of the front end of a spare tire toward the front side of the vehicle, and also facilitates the tipping up of a rear portion of the spare tire.

In order to solve the above problems, a lower structure of a rear part of a vehicle according to the present invention includes a spare tire housing formed at a rear floor of the rear part of the vehicle; a rear cross member which joins paired side frames located respectively on a left side and a right side in a vehicle width direction, and which is arranged at a location frontward of the spare tire housing; and a hook reinforcement for a tow hook, the hook reinforcement extending in a vehicle front and rear direction and arranged at a center, in the vehicle width direction, of a bottom surface of the spare tire housing; wherein a front end of the hook reinforcement is attached to the rear cross member; wherein the hook reinforcement forms a closed cross section in cooperation with the rear floor and is so formed that the closed cross section is larger at a rear side than at a front side; and wherein the hook reinforcement is divided into a reinforcement front portion and a reinforcement rear portion.

Regarding the lower structure of the rear part of the vehicle according to the present invention, a spare tire bracket to hold the spare tire is provided to a top surface of the spare tire housing, the spare tire bracket is formed such that a vertical cross section thereof in the front and rear direction is formed in a hat shape projecting upward, a top portion of the spare tire bracket can hold a center of the spare tire, a front portion of the spare tire bracket is attached to the spare tire housing at a location frontward of a location at which the hook reinforcement is divided, and a rear portion of the spare tire bracket is attached to the spare tire housing at a location rearward of the location at which the hook reinforcement is divided.

Regarding the lower structure of the rear part of the vehicle according to the present invention, a rear end portion of the hook reinforcement is provided with an inclined surface which is inclined upward while extending from a front side toward a rear end of the hook reinforcement.

Regarding the lower structure of the rear part of the vehicle according to the present invention, the rear end of the hook reinforcement is attached to a back panel.

Regarding the lower structure of the rear part of the vehicle according to the present invention, a bead, protruding downward and extending in the vehicle width direction, is provided at the rear floor, and the location of the bead corresponds to the location at which the hook reinforcement is divided.

Regarding the lower structure of the rear part of the vehicle according to the present invention, each of the side frames is divided in the vehicle front and rear direction into a frame front portion and a frame rear portion at a location rearward of the rear cross member, and the side frame is configured to be bent into a V-shape on the dividing location between the frame front portion and the frame rear portion as a base point when receiving a load from a rear side of the vehicle.

Regarding the lower structure of the rear part of the vehicle according to the present invention, an area of the closed cross section of the reinforcement rear portion becomes larger while heading toward a rear side of the vehicle, and the tow hook is attached to a substantially horizontal surface portion formed in a part of the reinforcement rear portion in which the area of the closed cross section thereof is largest.

According to the present invention, the following effects can be obtained.

A lower structure of a rear part of a vehicle according to the present invention includes a spare tire housing formed at a rear floor in the rear part of the vehicle; a rear cross member which joins paired side frames arranged respectively on a left side and a right side in a vehicle width direction, and which is provided at a location frontward of the spare tire housing; and a hook reinforcement for a tow hook, the hook reinforcement extending in a vehicle front and rear direction and being arranged at a center, in the vehicle width direction, of a bottom surface of the spare tire housing; wherein a front end of the hook reinforcement is attached to the rear cross member; wherein the hook reinforcement forms a closed cross section in cooperation with the rear floor and is formed such that the closed cross section is larger on a rear side than on a front side; and wherein the hook reinforcement is divided into a reinforcement front portion and a reinforcement rear portion.

Accordingly, when a load to the rear part of the vehicle from a rear side of the vehicle is applied, the reinforcement rear portion of the hook reinforcement receives the load and moves toward a front side of the vehicle, and then the load is transmitted to the reinforcement front portion. After the load is transmitted to the reinforcement front portion, the load is transmitted to the rear cross member. If the rear cross member cannot withstand a further load and as a result deforms, the reinforcement front portion deforms while turning around the joining portion to the rear cross member, so that the reinforcement rear portion deforms while maintaining the shape, and only the rear end moves upward because of high rigidity thereof. Such deformations occur because the area of the closed cross section of the hook reinforcement is larger on the rear side than on the front side. As a result, the rear floor and the hook reinforcement are bent into a V-shape (V-shape deformation).

The spare tire is arranged within the spare tire housing in a leaning orientation while the front end thereof is down. Therefore, when a rear portion of the spare tire is tipped up so as to be vertically turned around a front portion of the spare tire toward the front side of the vehicle, this vertical turn of the spare tire can be facilitated by the V-shape bend mentioned above. In addition, the load from the rear side of the vehicle can be reliably absorbed by the V-shape bend as well.

Regarding the lower structure of the rear part of the vehicle according to the present invention, a spare tire bracket to hold the spare tire is provided to a top surface of the spare tire housing, the spare tire bracket is formed such that vertical cross section thereof in the front and rear direction is formed in a hat shape projecting upward, a top portion of the spare tire bracket can hold a center of the spare tire, a front portion of the spare tire bracket is attached to the spare tire housing at a location frontward of a location at which the hook reinforcement is divided, and a rear portion of the spare tire bracket is attached to the spare tire housing at a location rearward of the location at which the hook reinforcement is divided. Therefore, the rear portion of the spare tire arranged within the spare tire housing in the leaning orientation while the front end thereof is down, can be surely tipped up to turn around the front portion of the spare tire by the V-shape bend of the hook reinforcement which occurs on the dividing location on the hook reinforcement as the base point.

Regarding the lower structure of the rear part of the vehicle according to the present invention, a rear end portion of the hook reinforcement is provided with an inclined surface which is inclined upward while extending from a front side toward a rear end of the hook reinforcement. Accordingly, after a load is applied to the rear part of the vehicle from a rear side of the vehicle and the deformation thereof progresses to a certain point, the inclined surface of the rear end portion of the hook reinforcement, which is being bent into a V-shape, moves to be perpendicular to the load acting from the rear side of the vehicle. Therefore, the load is applied to the hook reinforcement so as to furthermore facilitate the V-shape bend, and then the rear portion of the spare tire can be reliably tipped up further to turn around the front portion of the spare tire.

Regarding the lower structure of the rear part of the vehicle according to the present invention, the rear end of the hook reinforcement is attached to a back panel. Accordingly, when a load to the rear part of the vehicle from a rear side of the vehicle is first applied, the load is reliably transmitted from the back panel to the hook reinforcement. Therefore, the V-shaped bend of the hook reinforcement can be induced more reliably and quickly than otherwise.

Regarding the lower structure of the rear part of the vehicle according to the present invention, a bead protruding downward and extending in the vehicle width direction is provided to the rear floor, and a location of the bead corresponds to the location at which the hook reinforcement is divided. Accordingly, when V-shaped bending occurs at the dividing location between the front and rear portions of the hook reinforcement as a base point, the V-shaped bend at the rear floor is facilitated by the bead. This allows reliable V-shaped bending of the rear floor including the spare tire bracket and of the hook reinforcement. Therefore, the deformation load is transmitted efficiently from the rear floor to the spare tire bracket, and the rear portion of the spare tire is sufficiently tipped up.

Regarding the lower structure of the rear part of the vehicle according to the present invention, each of the side frames is divided in the vehicle front and rear direction into a frame front portion and a frame rear portion at a location rearward of the rear cross member, and the side frame is configured to be bent into a V-shape at the dividing location between the frame front portion and the frame rear portion as a base point when receiving a load from a rear side of the vehicle. Accordingly, after a load is applied to the rear part of the vehicle from a rear side of the vehicle and the deformation thereof progresses to a certain point, the side frame undergoes bending deformation, which starts at the dividing location between the frame front and rear portions. In this case, the side frame is likely to deform in the same direction as the bending deformation of the rear floor and the hook reinforcement. Furthermore, if the side frame is originally formed to curve slightly downward on the dividing location between the frame front and rear portions as a base point, or if a recess or bead is formed at an upper portion of the side frame on the dividing location, the V-shaped bend of the side frame will be more likely to be induced.

Regarding the lower structure of the rear part of the vehicle according to the present invention, an area of the closed cross section of the reinforcement rear portion becomes larger while heading toward a rear side of the vehicle, and the tow hook is attached to a substantially horizontal surface portion formed in a part of the reinforcement rear portion in which the area of the closed cross section thereof is largest. Accordingly, the V-shaped bend of the rear floor and the hook reinforcement, which is attributable to a load from a rear side of the vehicle, can be induced more reliably and quickly than otherwise. In addition, the attachment rigidity for the tow hook can be secured, and also the rigidity of the reinforcement rear portion can be enhanced by the tow hook. As a result, the above-described advantageous effects can be reliably demonstrated, so that a V-shaped bend can be induced smoothly and the rear portion of the spare tire can be reliably tipped up.

BRIEF DESCRIPTION OF THE DRAWINGS

FIG. 8 shows the rear part of the vehicle to which the lower structure of the first embodiment of the present invention is applied.

FIG. 10 shows the rear part of the vehicle to which the lower structure of the second embodiment of the present invention is applied.

DETAILED DESCRIPTION OF THE INVENTION

Hereinbelow, the present invention will be described in detail in embodiments and illustrated by the accompanying drawings.

FIGS. 1 to 10 show lower structures of a vehicle body rear part according to embodiments of the present invention. In the embodiments of the present invention, description will be given using a hatchback vehicle. However, the vehicle may be of some other type such as sedan, coupe, hardtop, SUV, station wagon, or minivan as long as structure thereof can yield the same advantageous effects as the present invention provides.

First Embodiment

A lower structure of a vehicle body rear part 1, according to a first embodiment of the present invention, will be described by referring to FIGS. 1 to 8.

As shown in FIGS. 1 to 6, a rear floor 2 expanding horizontally is provided to a lower portion of the vehicle body rear part 1 according to the first embodiment of the present invention. In a center portion of the rear floor 2, there is formed a spare tire housing 3 serving as a recessed housing portion to house and lay therein a spare tire S. On both left and right ends of the rear floor 2 in the vehicle width direction, side frames 4 extending in the front and rear direction are arranged, respectively. A rear cross member 5 joining these paired side frames 4 together is arranged on the bottom surface side of the rear floor 2 at a location forward of the spare tire housing 3. In addition, a hook reinforcement 6 extending in the vehicle front and rear direction is arranged on a bottom surface of the spare tire housing 3 at a center location thereof in the vehicle width direction. Therefore, the lower structure of the vehicle body rear part 1 according to the first embodiment includes the rear floor 2, the spare tire housing 3, the side frames 4, the rear cross member 5 and the hook reinforcement 6.

Furthermore, a fuel tank 7 is arranged on the bottom surface side of the rear floor 2 at a location forward of the spare tire housing 3, and rear seats 8 are arranged on the top surface side of the rear floor 2 at a location forward of the spare tire housing 3. A back panel 9 is arranged at the rear end of the rear floor 2, and a bumper member 10 is attached to a rear surface of the back panel 9. The bumper member 10 includes paired bumper attaching portions 10a situated respectively on left and right sides, in the vehicle width direction, of the bumper member 10 and protruding from a rear surface of the back panel 9 toward a rear side of the vehicle. These paired bumper attaching portions 10a are placed with a space therebetween in the vehicle width direction, and extend in the front and rear direction so as to be substantially collinear with the side frames 4, respectively. In addition, a bumper portion 10*b* extending in the vehicle width direction is provided to the rear ends of the paired bumper attaching portions 10*a*.

Figure 5:
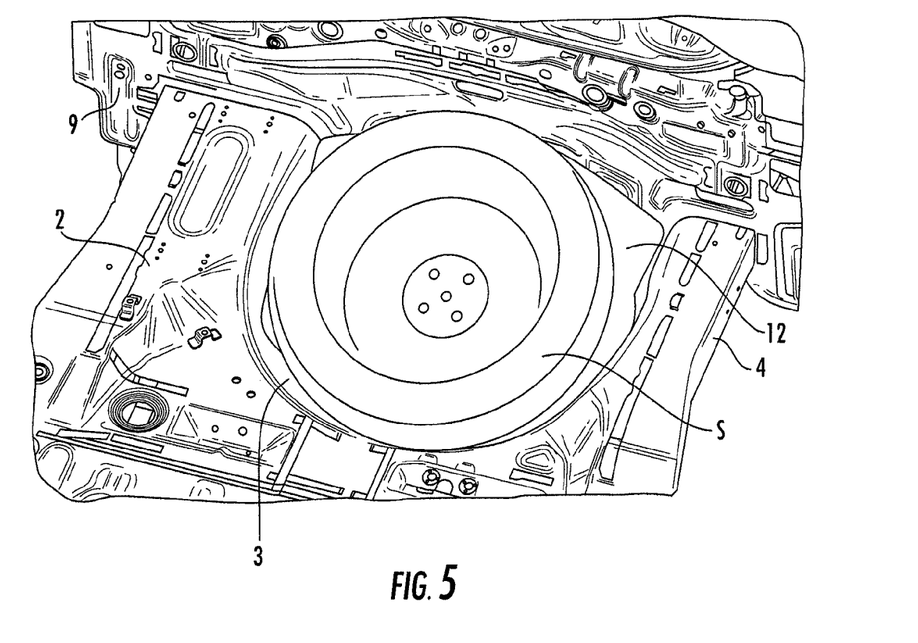
FIG. 5 is a top perspective view showing the rear part of the vehicle to which the lower structure of the first embodiment of the present invention is applied, and showing the positional relationship among peripheral components of a spare tire housing seen from a front side.
Figure 6:
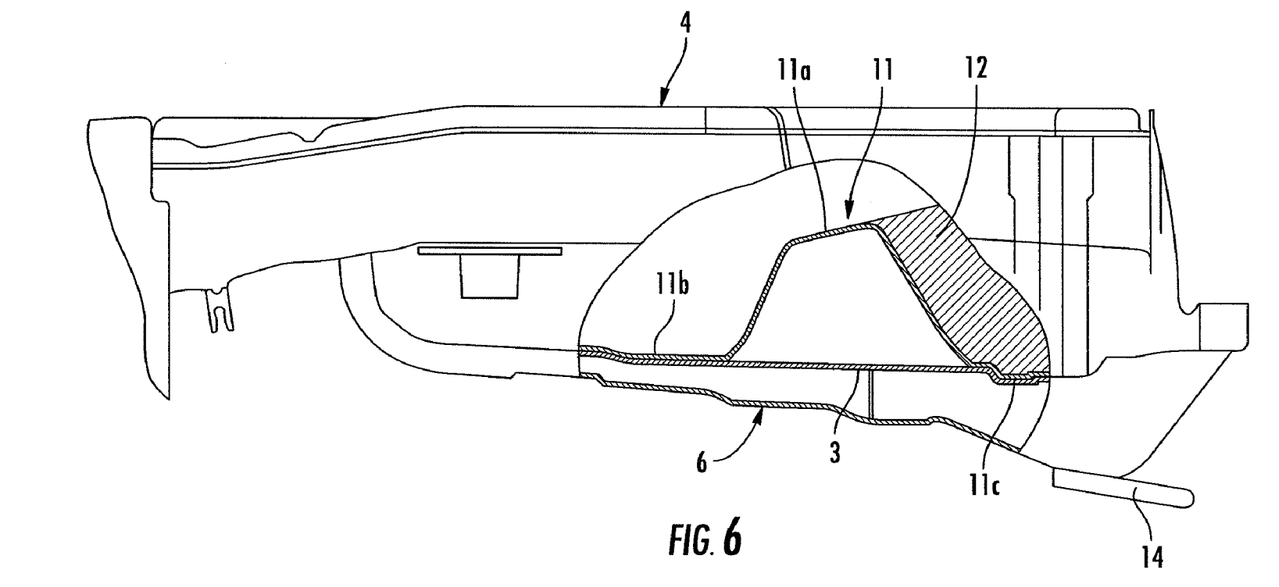
FIG. 6 is a cross-sectional view showing a part of the rear part of the vehicle to which the lower structure of the first embodiment of the present invention is applied, and showing a cross section taken along the line A-A of FIG. 3.
Figure 7:
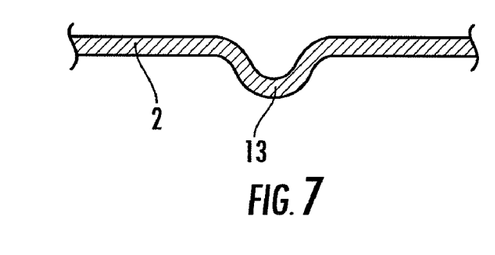
FIG. 7 is a cross-sectional view taken along the line B-B of FIG. 3.

A spare tire bracket 11 to hold the spare tire S is provided to a top surface of the spare tire housing 3. This spare tire bracket 11 is formed such that vertical cross section thereof in the front and rear direction is formed in a hat shape. A top portion 11*a* of the hat-shaped spare tire bracket 11 can hold the center of the spare tire S. Furthermore, the top portion 11*a* is formed to be inclined with the front side thereof which is situated lower. The spare tire S held by the top portion 11*a* is housed within the spare tire housing 3 while lifting up the rear portion thereof to incline upward. A front portion 11*b* of the hat-shaped spare tire bracket 11 is attached to the spare tire housing 3 at a location forward of the center location of the spare tire S. Furthermore, a rear portion 11*c* of the spare tire bracket 11 is attached to the spare tire housing 3 at a location rearward of the center location of the spare tire S. Furthermore, a spacer 12 to support a rear portion of the inclined spare tire S is arranged on an upper surface of the spare tire housing 3.

Figure 1:
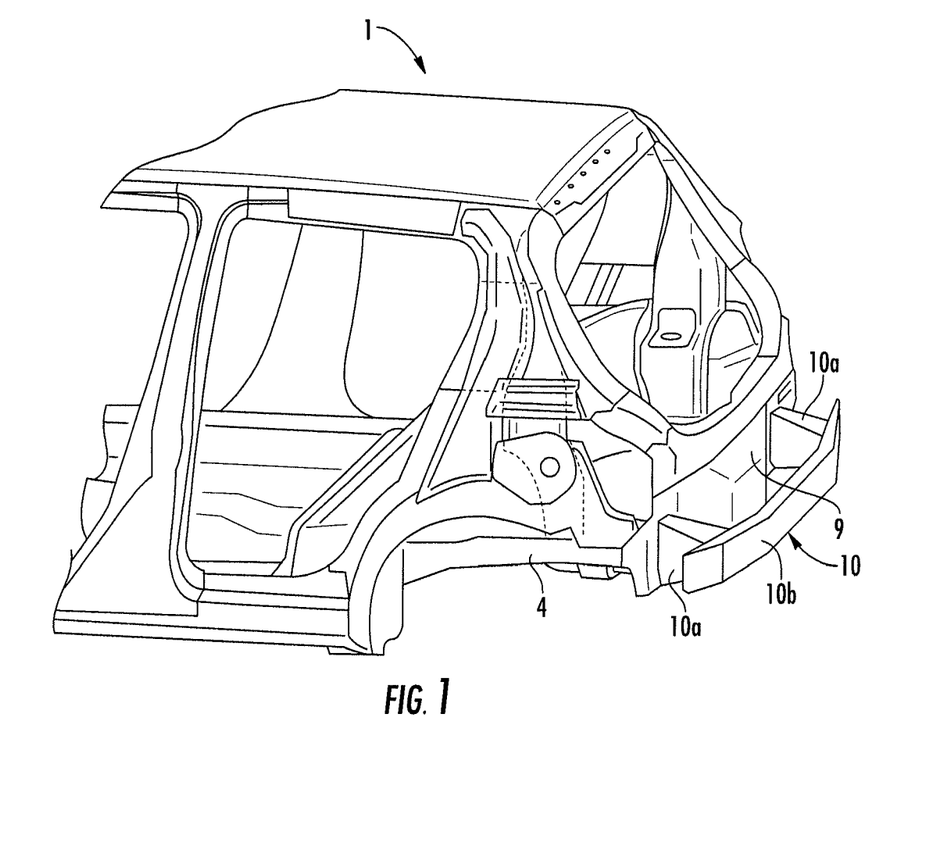
FIG. 1 is a perspective view showing a rear part of a vehicle to which a lower structure according to a first embodiment of the present invention is applied.
Figure 2:
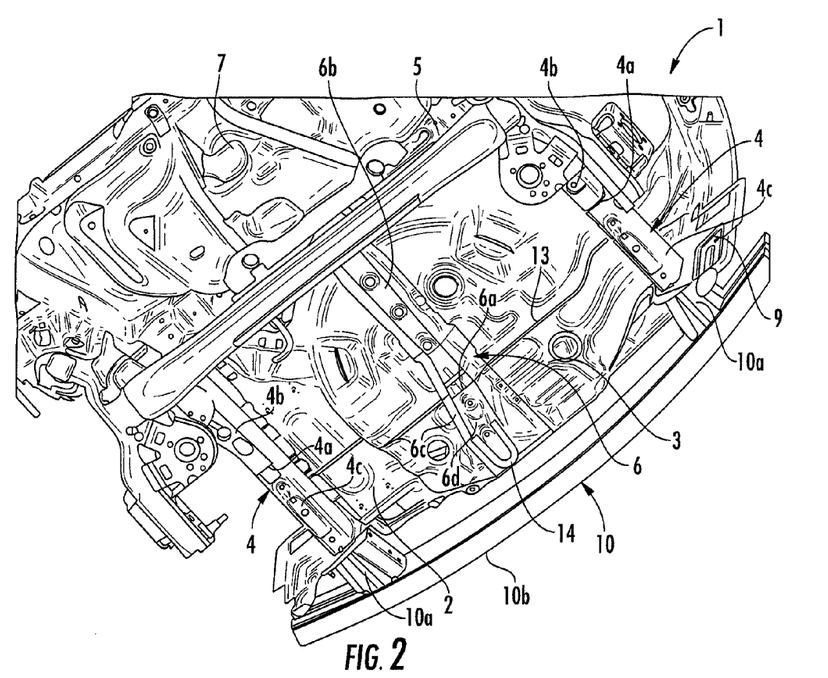
FIG. 2 is a bottom perspective view showing the rear part of the vehicle to which the lower structure of the first embodiment of the present invention is applied, and showing the positional relationship among peripheral components of a spare tire housing as seen from a front side.
Figure 3:
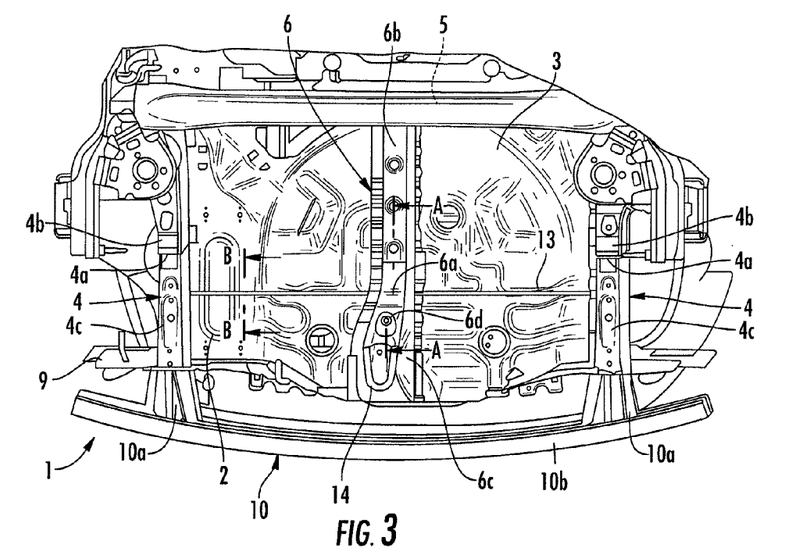
FIG. 3 is a bottom view showing the rear part of the vehicle to which the lower structure of the first embodiment of the present invention is applied, and showing the positional relationship among the peripheral components of the spare tire housing.
Figure 4:
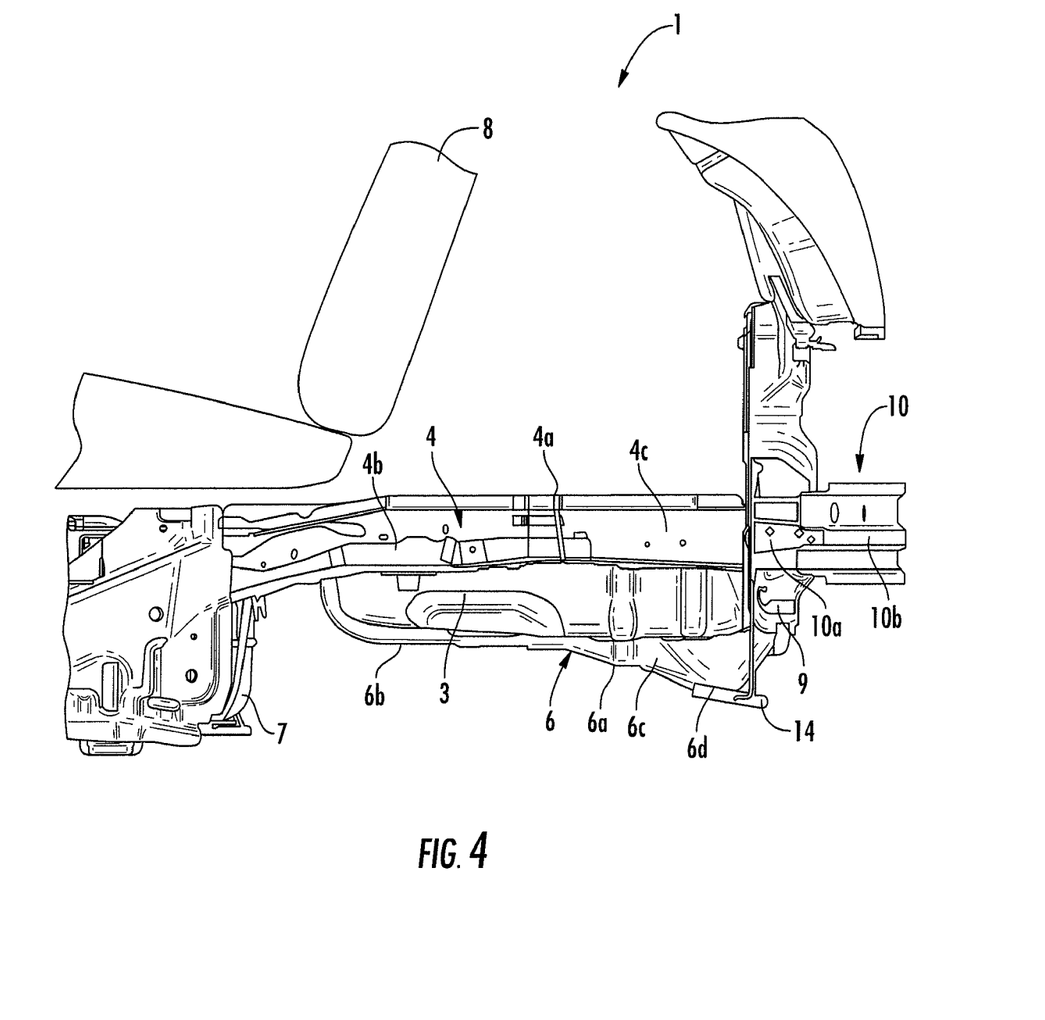
FIG. 4 is a side view showing the rear part of the vehicle to which the lower structure of the first embodiment of the present invention is applied, and showing the positional relationship among the peripheral components of the spare tire housing.

The side frames 4 and the hook reinforcement 6 according to the first embodiment will be described in detail. Each side frame 4 is divided in the front and rear direction into a frame front portion 4*b* and a frame rear portion 4*c* at a dividing location 4*a* rearward of the rear cross member 5. The side frame 4 is configured to deform, in particular, to be bent into a V-shape recessed downward on the dividing location 4*a* between the frame front and rear portions 4*b* and 4*c* as a base point (hereinafter, referred to as "V-shape bend"), when receiving a load from a rear side of the vehicle. Note that in the front and rear direction, the dividing location 4*a* on the side frame 4 corresponds to the center location of the spare tire S.

A front end portion of the hook reinforcement 6 is joined to the rear cross member 5. In addition, a rear end portion of the hook reinforcement 6 is provided with an inclined surface 6*d* which is inclined upward while extending from a front side thereof toward the rear end of the hook reinforcement 6. The rear end of the hook reinforcement 6 is attached to the back panel 9.

The hook reinforcement 6 is divided in the front and rear direction into a reinforcement front portion 6*b* and a reinforcement rear portion 6*c* at a dividing location 6*a* located between the center location of the spare tire S and the rear end of the spare tire bracket 11. A bead 13 (see FIG. 7) formed in a shape protruding downward and extending in the vehicle width direction, is provided to the rear floor 2. In the front and rear direction, the location of the bead 13 corresponds to the dividing location 6*a* on the hook reinforcement 6.

Furthermore, the hook reinforcement 6 is formed such that a vertical cross section thereof in the vehicle width direction, is formed in a hat shape. In a state of being attached to a bottom surface of the rear floor 2, the hook reinforcement 6 has a closed cross-sectional shape in cooperation with the rear floor 2. The hook reinforcement 6 is formed such that the area of its closed cross section is larger on a rear side than on a front side. In particular, the hook reinforcement 6 is formed such that the height of a closed cross section thereof becomes gradually larger from the front side to the rear side and that the width of the closed cross section becomes gradually larger from the front side to the rear side. In particular, the area of the closed cross section of the hook reinforcement 6 shows a drastic change at a location corresponding to the center of the spare tire S.

In particular, the area of the closed cross section of the reinforcement rear portion 6*c* of the hook reinforcement 6 becomes larger while heading toward the rear side of the vehicle. A substantially horizontal surface portion 6*d* is formed in a part of the reinforcement rear portion 6*c* where the area of the closed cross section thereof is largest. To this substantially horizontal surface portion 6*d*, a tow hook 14 is fixedly attached on front end portion thereof by welding. A rear end portion of the tow hook 14 is arranged to protrude obliquely downward towards the rear side of the vehicle from the reinforcement rear portion 6*c*. Such a structure increases the rigidity of the reinforcement rear portion 6*c*. The rigidity of the reinforcement rear portion 6*c* is higher than that of the reinforcement front portion 6*b*.

Figure 8A:
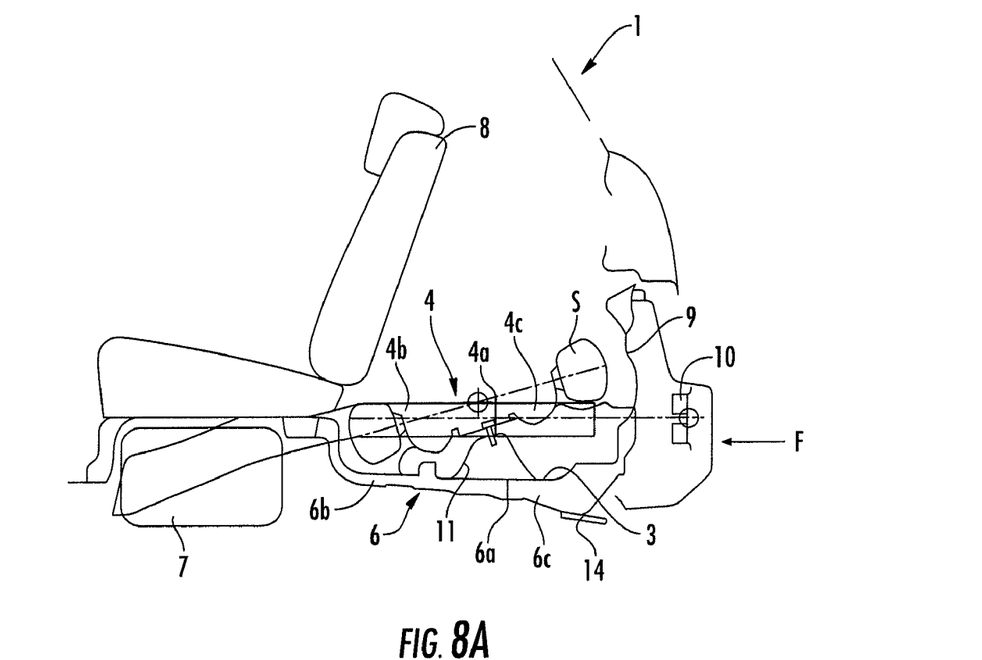
FIG. 8(a) is a side view illustrating a state before the application of a load to the rear part of the vehicle from a rear side of the vehicle.

FIG. 8(*a*) illustrates a state before a load F is applied to the vehicle to which the lower structure of the vehicle body rear part 1 according to the first embodiment of the present invention is provided. In particular, FIG. 8(*a*) shows a state before the load F is applied to the rear bumper member 9 in the vehicle body rear part 1 from a rear side toward a front side of the vehicle.

Figure 8B:
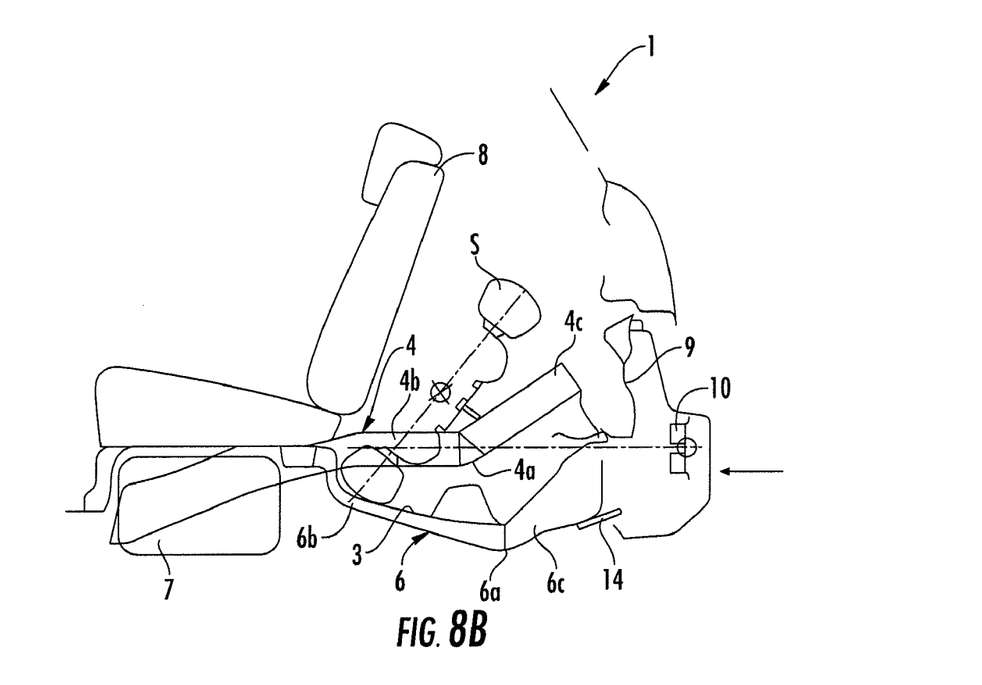
FIG. 8(b) is a side view illustrating a state after the application of the load.

Furthermore, as shown in FIG. 8(*b*), when the load F acting from the rear side toward the front side of the vehicle is applied to the back panel 9 and the rear floor 2 from the bumper member 10 in the vehicle body rear part 1, the load F is transmitted to rear portions of the side frames 4, the spare tire housing 3 and the hook reinforcement 6 via the bumper attaching portions 10*a*. While deforming the spare tire housing 3, the input causes the V-shape bend of the rear floor 2 and the hook reinforcement 6, respectively, at the arrangement location of the bead and at the dividing location 6*a* between the reinforcement front and rear portions 6*b* and 6*c*. Together with this, the rear ends of the frame front portions 4*b* and the front ends of the frame rear portions 4*c* at their respective dividing locations 4*a*, are moved downward, causing the V-shape bend of the side frames 4.

A resistance is produced when the rear floor 2, the hook reinforcement 6, and the side frames 4 are subjected to bending deformation in the same direction. Accordingly, the load F applied to the vehicle body rear part 1 from the rear side of the vehicle, is absorbed. In addition, when the spare tire housing 3 is deformed by the load F, a rear portion of the spare tire S placed to incline while the front end thereof is down, is tipped up to turn around a front portion of the spare tire S and vertically turns greatly toward the front side of the vehicle.

As described above, according to the first embodiment of the present invention, the front end of the hook reinforcement 6 is attached to the rear cross member 5, the hook reinforcement 6 forms a closed cross section in cooperation with the rear floor 2 and is formed such that the closed cross section is larger on a rear side than on a front side, and the hook reinforcement 6 is divided into the reinforcement front portion 6*b* and the reinforcement rear portion 6*c*. Therefore, when a load to the vehicle body rear part from a rear side of the vehicle, is applied, the reinforcement rear portion 6*c* of the hook reinforcement 6 receives the load and moves toward a front side of the vehicle, and then the load is transmitted to the reinforcement front portion 6*b*. After transmission to the reinforcement front portion 6*b*, the load is transmitted to the rear cross member 5. If the rear cross member 5 cannot withstand a further load and therefore deforms, the reinforcement front portion 6*b* deforms while turning around the joining portion to the rear cross member 5, so that the reinforcement rear portion 6*c* deforms while maintaining the shape and only the rear end moves upward because of the high rigidity thereof. Such deformations occur because the area of the closed cross section of the hook reinforcement 6 is larger on the rear side than on the front side. As a result, the rear floor 5 and the hook reinforcement 6 are bent into a V-shape (deformed into a V-shape), respectively.

The spare tire S is arranged within the spare tire housing 3 in the inclined orientation while the front end thereof is down. Therefore, when the rear portion of the spare tire S is tipped up to vertically turn around the front portion of the spare tire S toward the front side of the vehicle, this vertical turn of the spare tire S can be facilitated by the V-shape bend mentioned above. In addition, the load F from the rear side of the vehicle can be reliably absorbed by the V-shape bend as well.

According to the first embodiment of the present invention, the top portion 11a of the spare tire bracket 11 can hold the center of the spare tire S, the front portion 11b of the spare tire bracket 11 is attached to the spare tire housing 3 at a location forward of the dividing location 6a of the hook reinforcement 6, and the rear portion 11c of the spare tire bracket 11 is attached to the spare tire housing 3 at a location rearward of the dividing location 6a of the hook reinforcement 6. Therefore, the rear portion of the spare tire S placed in the spare tire housing 3 in the inclined orientation while the front end thereof is down, can be reliably tipped up to turn around the front portion of the spare tire S by the V-shape bend of the hook reinforcement 6 that occurs at the dividing location 6a on the hook reinforcement 6 as a base point.

According to the first embodiment of the present invention, the rear end portion of the hook reinforcement 6 is provided with the inclined surface 6d which is inclined upward while extending from a front side thereof toward the rear end of the hook reinforcement 6. Therefore, after the vehicle body rear part 1 receives a load F from a rear side of the vehicle and deforms to a certain degree, the inclined surface 6d of the rear end portion of the hook reinforcement 6, which is bent into a V-shape, moves to be perpendicular to the load F acting from the rear side of the vehicle. Accordingly, the load F is applied to the hook reinforcement 6 so as to further facilitate the V-shape bend, whereby the rear portion of the spare tire S can be reliably tipped up further to turn about the front portion of the spare tire S.

According to the first embodiment of the present invention, the rear end of the hook reinforcement 6 is attached to the back panel 9. Therefore, when a load F to the vehicle body rear part 1 from a rear side of the vehicle, is firstly applied, the load F is reliably transmitted from the back panel 9 to the hook reinforcement 6. Accordingly, the V-shape bend of the hook reinforcement 6 can be induced more surely and quickly than otherwise.

According to the first embodiment of the present invention, the bead 13 protruding downward and extending in the vehicle width direction, is provided to the rear floor 2, and the location of the bead 13 corresponds to the dividing location 6a of the hook reinforcement 6. Therefore, when V-shape bending occurs at the dividing location 6a of the hook reinforcement 6 as a base point, the V-shape bend of the rear floor 2 is facilitated by the bead 13. This allows reliable V-shape bending of the rear floor 2 including the spare tire bracket 3 and of the hook reinforcement 6. Accordingly, the deformation load is transmitted efficiently from the rear floor 2 to the spare tire bracket 3, so that the rear portion of the spare tire S can be tipped up sufficiently.

According to the first embodiment of the present invention, each of the side frames 4 is divided in the vehicle front and rear direction into the frame front portion 4b and the frame rear portion 4c at a location rearward of the rear cross member 5, and the side frame 4 is configured to be bent into a V-shape on the dividing location 4a between the frame front portion 4b and the frame rear portion 4c as a base point when receiving a load F from a rear side of the vehicle. Therefore, after a load F is applied to the vehicle body rear part 1 from a rear side of the vehicle and the deformation thereof progresses to a certain point, the side frame 4 undergoes bending deformation, which starts at the dividing location 4a between the frame front and rear portions 4b and 4c. In this case, the side frame 4 is likely to deform in the same direction as the bending deformation of the rear floor 2 and the hook reinforcement 6. Furthermore, the V-shape bend of the side frame 4 can be more likely if the side frame 4 is originally formed to curve slightly downward at the dividing location 4a between the frame front and rear portions 4b and 4c as a base point, or if a recess or bead is formed in an upper portion of the side frame 4 at the dividing location 4a.

According to the first embodiment of the present invention, the area of the closed cross section of the reinforcement rear portion 6c becomes larger while heading toward a rear side of the vehicle, and the tow hook 14 is attached to the substantially horizontal surface portion 6d formed in a part of the reinforcement rear portion 6c in which the area of the closed cross section thereof is largest. Therefore, the V-shape bend of the rear floor 2 and the hook reinforcement 6, which is attributable to a load F from a rear side of the vehicle, can be induced more reliably and quickly than otherwise. In addition, the attachment rigidity for the tow hook 14 can be secured, and also the rigidity of the reinforcement rear portion 6c can be enhanced by the tow hook 14. As a result, the above-described advantageous effects can be reliably demonstrated, so that V-shape bend can be induced smoothly and the rear portion of the spare tire S can be reliably tipped up.

Second Embodiment

Figure 9:
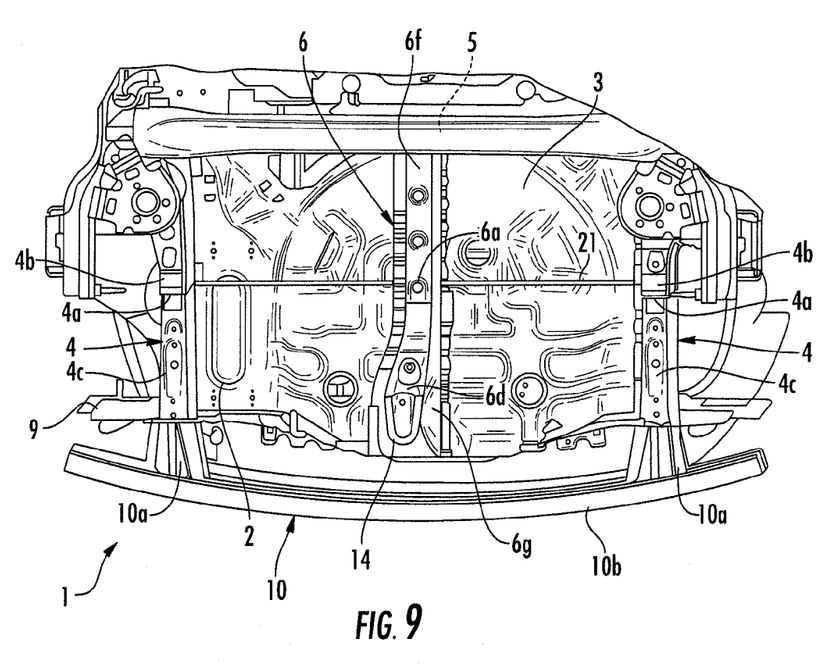
FIG. 9 is a bottom view showing the rear part of the vehicle to which the lower structure of a second embodiment of the present invention is applied, and showing the positional relationship among the peripheral components of the spare tire housing.

A second embodiment of the present invention will be described by referring to FIGS. 9 and 10. The basic configuration in the second embodiment is the same as that in the first embodiment. Description will be provided using the same reference numerals and names as those in the first embodiment for the same components as those in the first embodiment. In the following, a configuration that differs from the first embodiment will be described.

The hook reinforcement 6 is so formed that the vertical cross section thereof in the vehicle width direction is formed in a hat shape. As shown in FIG. 9, the hook reinforcement 6 is divided in the front and rear direction into a reinforcement front portion 6f and a reinforcement rear portion 6g at a dividing location 6e located between the center location of the spare tire S and the front end of the spare tire bracket 11. A bead 21 formed in a shape protruding upward and extending in the vehicle width direction is provided to the rear floor 2. In the front and rear direction, the location of the bead 21 coincides with the dividing location 6e of the hook reinforcement 6.

Figure 10A:
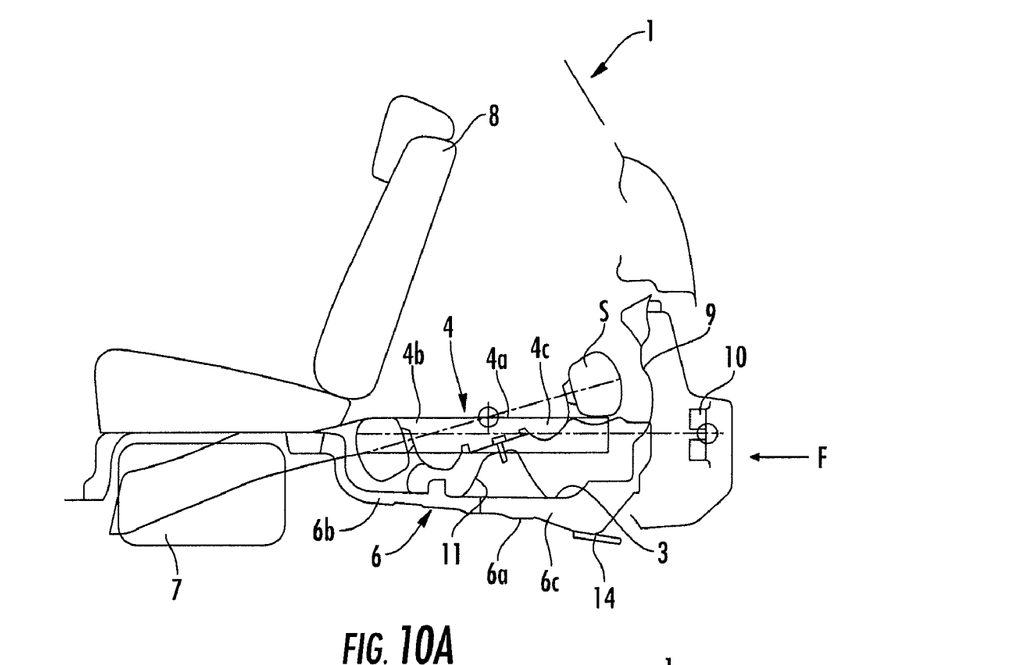
FIG. 10(a) is a side view illustrating a state before the application of a load to the rear part of the vehicle from a rear side of the vehicle.

FIG. 10(*a*) shows a state before a load F is applied to the vehicle to which the lower structure of the vehicle body rear part 1 according to the second embodiment of the present invention is provided. In particular, FIG. 10(*a*) shows a state before the load F is applied to the rear bumper member 9 in the vehicle body rear part 1 from a rear side toward a front side of the vehicle.

Figure 10B:
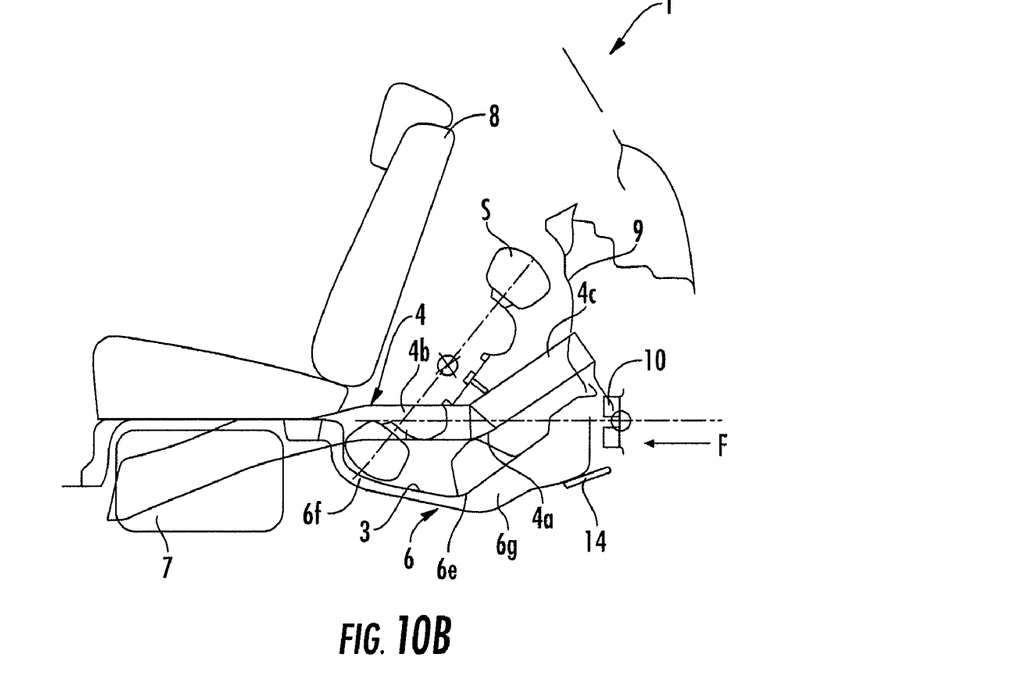
FIG. 10(b) is a side view illustrating a state after the application of the load.

In this case, as shown in FIG. 10(*b*), unlike the first embodiment, when the load F acting from the rear side toward the front side of the vehicle, is applied to the back panel 9 and the rear floor 2 from the bumper member 10 in the vehicle body rear part 1, the rear floor 2 and the hook reinforcement 6 are bent into a V-shape, respectively, at the arrangement location of the bead 21, and at the dividing location 6e between the reinforcement front and rear portions 6f and 6g while the spare tire housing 3 is deformed.

As described above, according to the second embodiment of the present invention, the same advantageous effects as those by the first embodiment can be achieved.

Hereinabove, embodiments of the present inventions have been described; however, the present invention is not limited to these above-described embodiments. Various modifications and changes can be made in accordance with the technical ideas of the present invention.

For example, as a modification of the embodiments, the spare tire bracket 11 and the spacer 12 can be formed integrally with each other. Such a configuration can also yield the same advantageous effects as those of the embodiments.

What is claimed is:

1. A lower structure of a vehicle body rear part of a vehicle body, comprising:
    a pair of side frames spaced apart from each other in a vehicle width direction;
    a spare tire housing formed in a rear floor of the vehicle body rear part, and arranged between the pair of side frames;
    a rear cross member which joins the pair of side frames, and which is arranged at a location forward of the spare tire housing; and
    a hook reinforcement for a tow hook, extending in a vehicle longitudinal direction and being arranged at a center, in the vehicle width direction, of a bottom surface of the spare tire housing;
    wherein a front end of the hook reinforcement is attached to the rear cross member;
    wherein the hook reinforcement forms a closed cross section in cooperation with the rear floor;
    wherein the closed cross section becomes larger as the hook reinforcement proceeds rearwardly along the vehicle longitudinal direction; and
    wherein the hook reinforcement includes a reinforcement front portion which is arranged rearward, with respect to the vehicle longitudinal direction, of the rear cross member, and a reinforcement rear portion which is arranged rearward, with respect to the vehicle longitudinal direction, of the reinforcement front portion, and wherein a rear end of the reinforcement front portion connects to a front end of the reinforcement rear portion at a connecting part therebetween.

2. The lower structure of the vehicle body rear part according to claim 1, wherein
    a spare tire bracket to hold the spare tire is provided at a top surface of the spare tire housing,
    the spare tire bracket has a cross section in a vertical plane extending in the vehicle longitudinal direction that is formed in a hat shape,
    a top portion of the spare tire bracket can hold a center of the spare tire,
    a front portion of the spare tire bracket is attached to the spare tire housing at a location forward, with respect to the vehicle longitudinal direction, of the connecting part between the reinforcement front portion and the reinforcement rear portion, and
    a rear portion of the spare tire bracket is attached to the spare tire housing at a location rearward, with respect to the vehicle longitudinal direction, of the connecting part between the reinforcement front portion and the reinforcement rear portion.

3. The lower structure of the vehicle body rear part according to claim 1, wherein
    a rear end portion of the hook reinforcement has an inclined surface which is inclined upward while heading in a direction from a front end of the hook reinforcement to a rear end of the hook reinforcement.

4. The lower structure of the vehicle body rear part according to claim 3, further comprising a back panel at a rear end of the vehicle body and extending along the vehicle width direction, and wherein
    the rear end of the hook reinforcement is attached to the back panel.

5. The lower structure of the vehicle body rear part according to claim 1, wherein
    a bead protruding downward and extending in the vehicle width direction, is arranged on the rear floor, and
    a location of the bead, with respect to the vehicle longitudinal direction, corresponds to a longitudinal location of the connecting part of the hook reinforcement.

6. The lower structure of the vehicle body rear part according to claim 1, wherein
    each of the side frames has a frame front portion which is arranged rearward, with respect to the vehicle longitudinal direction, of the rear cross member, and a frame rear portion which is arranged rearward, with respect to the vehicle longitudinal direction, of the frame front portion,
    a rear end of the frame front portion of each side frame being connected to a front end of the frame rear portion of the side frame,
    a connecting part between the frame front portion and the frame rear portion being positioned at a location rearward of the rear cross member, and
    each of the side frames is configured to be bent into a V-shape such that the connecting part between the frame front portion and the frame rear portion is downwardly projected when receiving a load from a rear side of the vehicle.

7. The lower structure of the vehicle body rear part according to claim 1, wherein
    an area of the closed cross section of the reinforcement rear portion becomes larger while heading rearwardly along the vehicle longitudinal direction, and
    the tow hook is attached to a lower end of a part of the reinforcement rear portion in which the area of the closed cross section thereof is largest.

* * * * *